Figure 1:
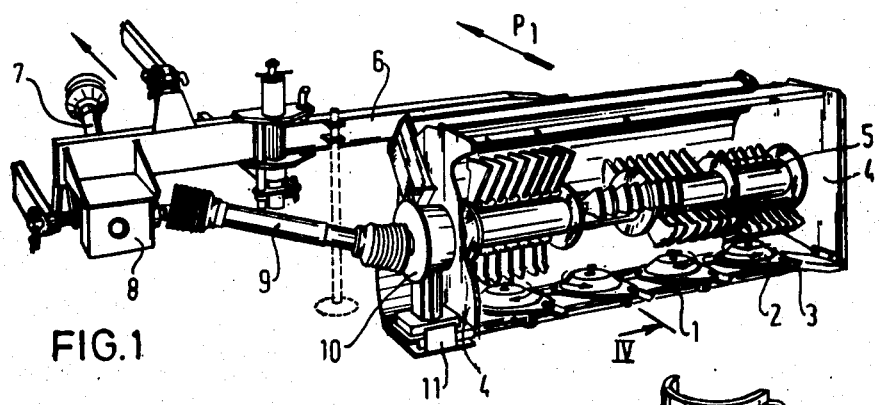

United States Patent [19]

Vissers et al.

[11] Patent Number: 4,468,916
[45] Date of Patent: Sep. 4, 1984

[54] MOWING DEVICE COMPRISING A DIVIDED CUTTER BAR

[75] Inventors: Hermanus H. Vissers; Hendrikus C. Van Staveren, both of Nieuw-Vennep; Marinus H. Weststrate, Lisse, all of Netherlands

[73] Assignee: Multinorm B.V., Nieuw-Vennep, Netherlands

[21] Appl. No.: 356,790

[22] Filed: Mar. 10, 1982

[30] Foreign Application Priority Data

Mar. 13, 1981 [NL] Netherlands .......................... 8101239

[51] Int. Cl.³ .......................................... A01D 35/264
[52] U.S. Cl. .................................................. 56/13.6
[58] Field of Search ................... 56/13.6, 192, 295, 6, 56/16.4, DIG. 1

[56] References Cited

U.S. PATENT DOCUMENTS

| | | | |
|---|---|---|---|
| 3,524,306 | 8/1970 | Reber | 56/13.6 |
| 4,157,004 | 6/1979 | van der Lely | 56/13.6 |
| 4,183,196 | 1/1980 | Oosterling | 56/13.6 |
| 4,304,088 | 12/1981 | Werner | 56/13.6 |

*Primary Examiner*—Jay N. Eskovitz
*Attorney, Agent, or Firm*—Diller, Ramik & Wight

[57] ABSTRACT

The casing of a rotary mowing device is formed of a series of tubular sections secured together to form a hollow, rigid unit. The intermediate portion is formed of a series of similar sections defining an open-ended, generally rectangular tube and there are two end sections closing these ends. The casing houses a series of gears and at intervals upstanding shafts project from the casing and to which the rotary cutting members are attached. The parting line between sections are disposed in planes each of which contains the axis of one of the shafts.

13 Claims, 9 Drawing Figures

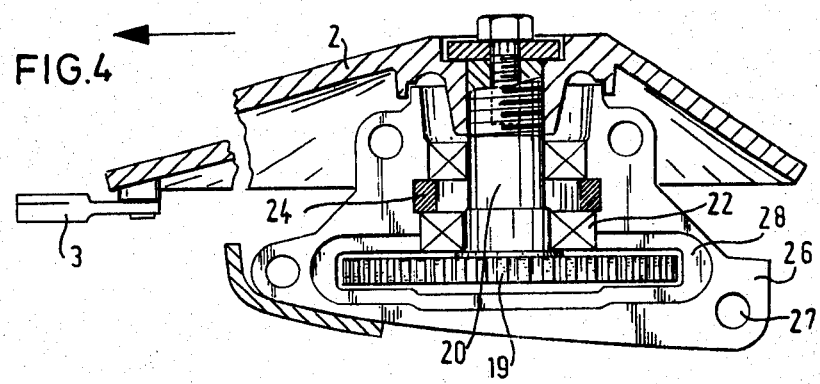
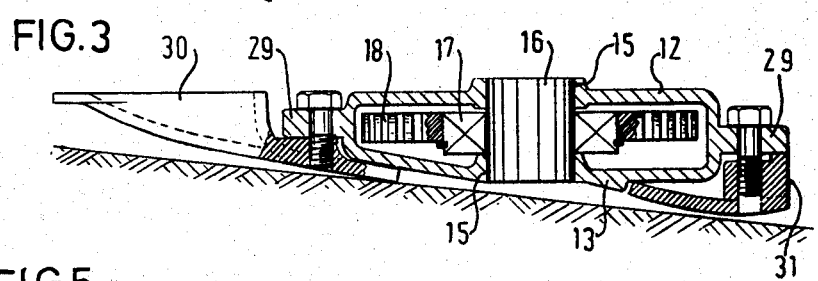
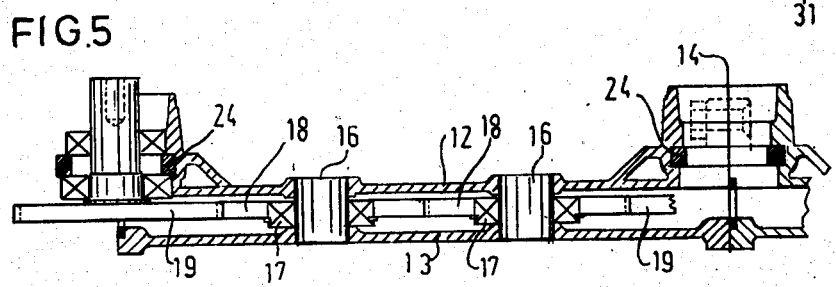
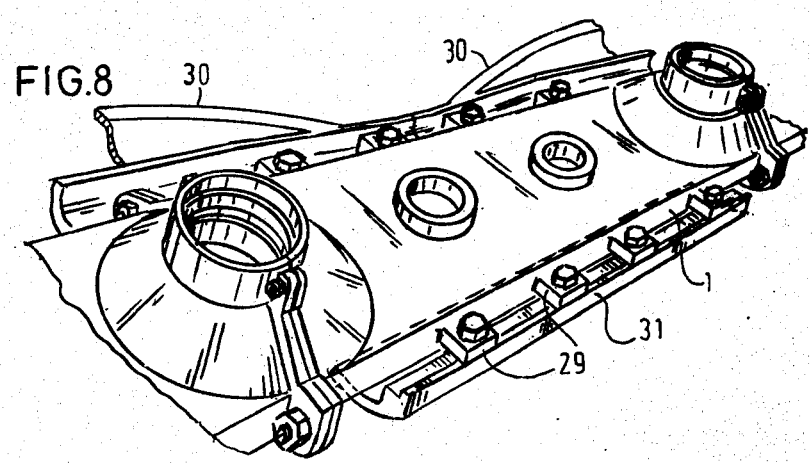

MOWING DEVICE COMPRISING A DIVIDED CUTTER BAR

The invention relates to a mowing device essentially comprising an elongate, closed casing being movable along the ground, extending transversely of the direction of movement and accommodating the driving gear for causing to rotate a plurality of standing shafts for the cutting members projecting across the top wall.

It is common practice to build up the casing for the driving gear from cold-deformed bottom and cover parts of sheet material, said parts being fastened to one another after the various elements of the drive, inter alia the standing shafts for the cutting members have been arranged in place. Such a building mode requires comparatively many components, which requires a large stock for large production series. Moreover, mounting of such a casing takes relatively much time.

The invention has for its object to obviate the aforesaid disadvantages and to construct the casing in a manner such that few components are required and mounting can be rapidly carried out.

The device according to the invention is distinguished in that the casing is built up from two or more box-shaped parts having their head faces clamped to one another. Owing to the box shape the positions of the shafts of the drive in the top and bottom walls of the casing can be accurately arranged opposite one another during the manufacture of the casing so that adjustment during mounting is dispensed with.

Preferably the casing is built up from two or more similar or substantially similar intermediate parts and two head parts. These similar intermediate parts reduce the number of different structures and permit of building a length of the casing as desired without the need for keeping a stock of different casing parts.

Preferably the head parts are substantially similar to one another.

Cheap manufacture is obtained by making the intermediate parts and/or the head parts of the casing from cast or spray material such as cast iron, aluminium, magnesium or synthetic resin.

According to the invention, in order to obtain comparatively short head faces it is preferred for the head faces of the casing parts to be clamped to one another to extend in the direction of movement and/or to be in a vertical plane.

In order to ensure an optimum smooth power transmission in the drive it is preferred to pass one or each head face of a casing part through the centre line of a driving shaft journalled in the casing. Therefore, any settlement of the casing parts relatively to one another will affect the power transmission in the drive itself to a relatively lesser extent.

In a preferred embodiment one or each head face of a casing part is passed through the shaft of a cutting member projecting across the top wall of the casing.

According to the invention the casing parts are preferably mounted to one another by means of one or more clamping bolts located outside the neutral plane of the casing. These clamping bolts may cover the whole length of the composite casing.

Preferably a centering member is arranged between the casing parts to be clamped to one another in order to accurately position the casing parts during mounting, said centering member suppressing the need for using fitted bolts.

Such a centering member is preferably formed by a ring fitted in an annular recess of the casing parts, which ring may also be the outer ring of the roller bearing of the shaft.

In order to obtain a fluid-tight casing a sealing agent is provided between the head faces of the casing parts preferably accommodated in a depressed part in one or in each connecting face of a casing part.

According to the invention each casing part may be provided with fastening spots for mounting accessories such as stone screens, nose fillets, supporting skids and so on.

The invention will be described more fully with reference to two embodiments.

The drawing shows in

Figure 2:
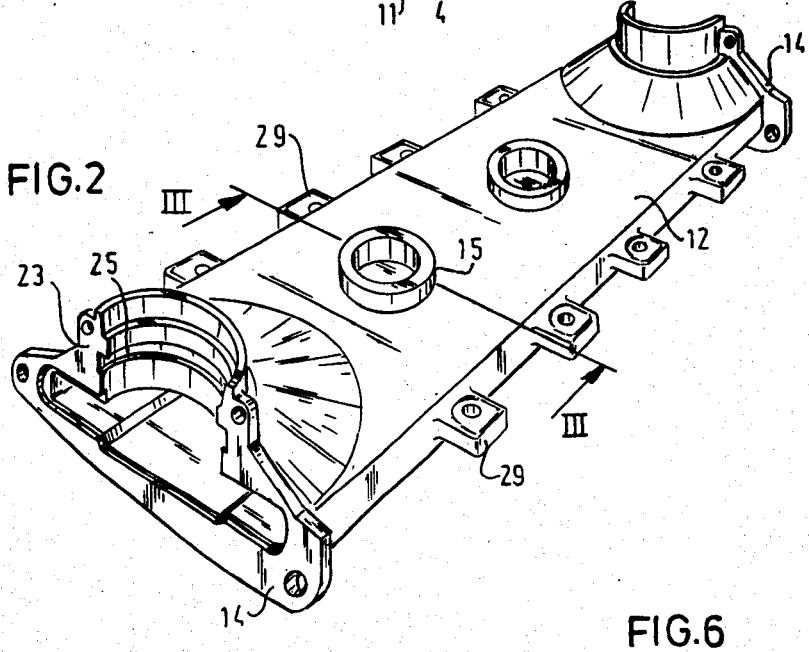
Figure 6:
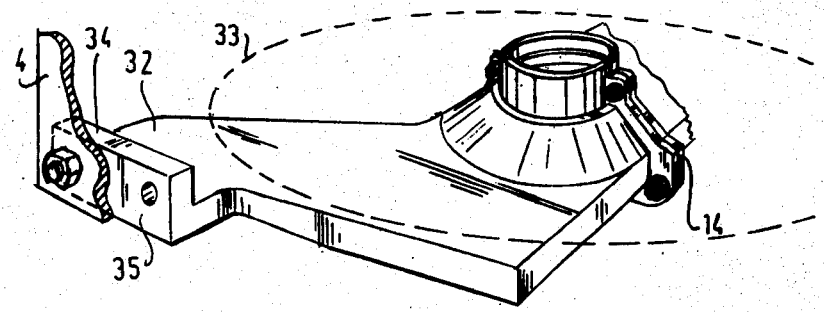
Figure 7:
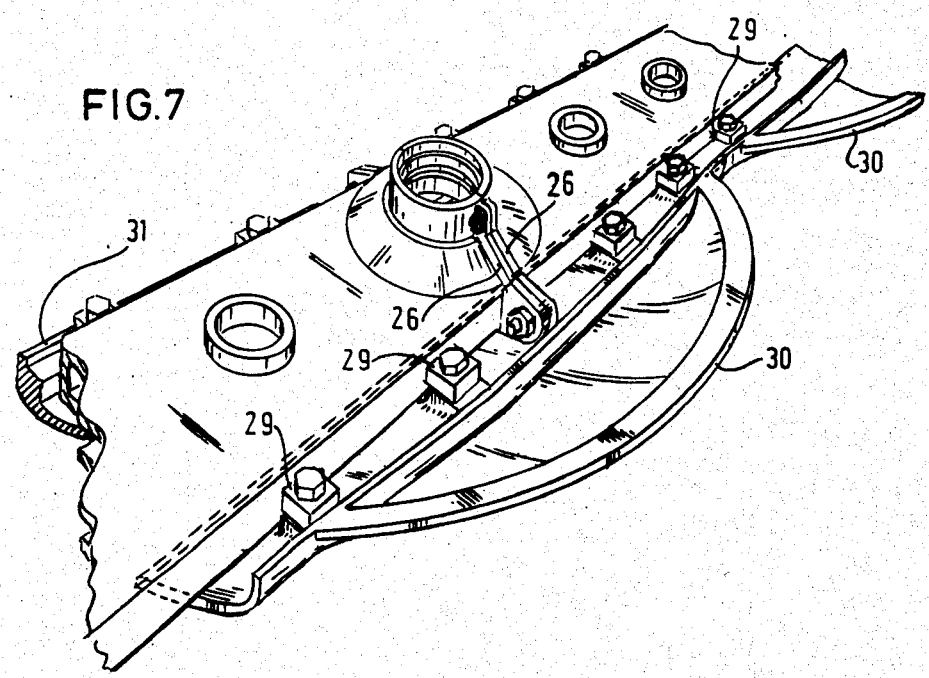
Figure 9:
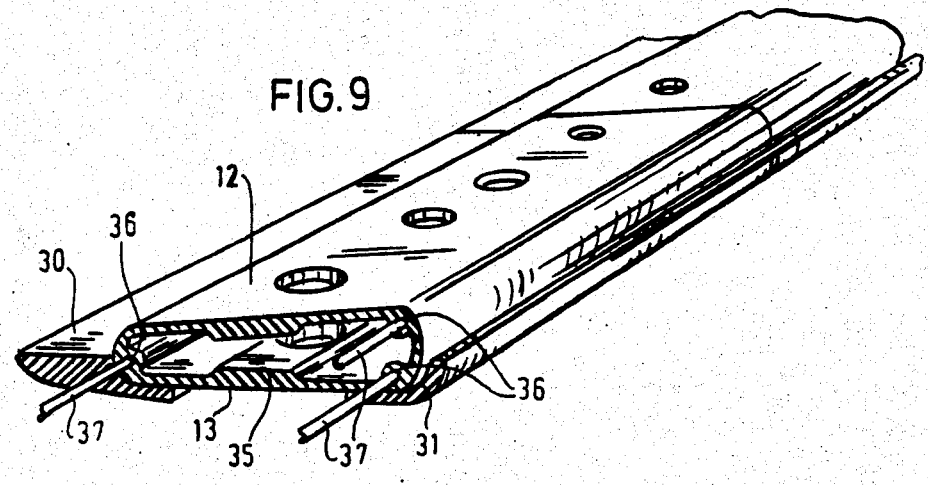

FIG. 1 a perspective rear view of a mower comprising a casing built up in accordance with the invention, FIG. 2 a perspective plan view of a casing part embodying the invention, FIG. 3 a sectional view taken on the line III—III in FIG. 2, FIG. 4 a sectional view taken on the line IV—IV in FIG. 1, FIG. 5 a longitudinal sectional view of part of the casing shown in FIG. 1, FIG. 6 a perspective plan view of a head part of the casing of FIG. 1, FIG. 7 a perspective plan view of part of the front side of the casing provided with a nose fillet, FIG. 8 a perspective plan view of the rear wall of the casing provided with a supporting skid, FIG. 9 a perspective plan view of a casing for use in a mower in an alternative embodiment.

The mower shown in FIG. 1 essentially comprises a flat, closed casing 1 accommodating the driving gear of angular discs 2 located above said casing, and being provided at their circumference with cutters 3. The casing 1 is arranged between two side screens 4 and between these side screens 4 and above the cutting members 2 is journalled a rotatable shaft 5 provided with means for overtop delivery of the mown crop when the mower is moved across the field in the direction of the arrow P1. The assembly of the casing 1, the screens 4 and the shaft 5 is supported in a frame 6, which can be fastened by means of a three-point hitch to the rear side of an agricultural tractor (not shown). Driving takes place through a driving shaft 7 to be coupled with the power take-off shaft of the tractor, said shaft 7 driving through a gear box 8 the auxiliary shaft 9, which leads to a second gear box 10. The gear box 10 causes to rotate the shaft 5 as well as, through an intermediate gear box 11, the drive for the cutting members 2 in the casing 1.

According to the invention the casing 1 is built up from a plurality of preferably similar, box-shaped parts, one of which is shown in detail in FIGS. 2, 3 and 4.

Each part comprises a top wall 12, a bottom wall 13 and a front and rear wall, said walls forming a box. Each box has furthermore a head face 14 on each side, the arrangement being such that in the assembled state the head face extends in the direction of movement P1 and is, moreover, located in a vertical plane. The head face is furthermore passed through the centre line of a shaft for driving the cutting members 2 projecting across the top wall 12 of the box. (see also FIG. 5).

The driving gear of the cutting members in the casing 1 comprises a plurality of adjacent pinions whose shafts are journalled in the top and bottom walls of the casing 1. It will be apparent from FIG. 2 that between the shafts for the cutting members passed through the top wall 12 there are journalled two intermediate shafts in annular ridges 15 in the top and bottom walls. Into these ridges 15 can be pressed a stub shaft 16, on which a bearing 17 is secured, which bearing 17 holds an intermediate pinion 18. (see FIG. 3).

These intermediate pinions are in mesh with the main pinions 19 fastened to the lower part of a main shaft 20 passed through the top wall 12 of the casing, to the top part of which is fastened the dish 2 of the nest 3. The main shaft 20 is journalled in two roller bearings 22 arranged one above the other and being supported in a hub 23 arranged on the top side of the top wall 12. Between the bearings 22 is arranged a ring 24 accurately fitting in a groove 25 of the hub 23.

On the outer side of the hub 23, the top wall 12, the bottom wall 13 and on the front and rear walls a flange 26 having holes 27 is provided integrally with the casing part. The side of the flange 26 directed to the front in FIG. 2 constitutes at the same time the head face 14 of the casing part.

This head face has a depression 28 for receiving sealing means. This depression need only be provided on one side, that is to say, in the foremost flange 26 as viewed in FIG. 2, which simplifies the manufacturing and mounting process.

Each casing part is provided at the front and rear walls with protruding supports 29 having an uninterrupted hole. These supports 29 may serve to fasten, for example, a nose fillet or a support protector 30 (see FIGS. 3 and 7) as well as a supporting skid 31 on the rear side (see FIGS. 3 and 8). These elements to be bolted have a shape such that the bottom 13 of the casing 1 will not be dragged along the ground. Wear of the casing is thus avoided and the wearing elements can be readily replaced.

The parts of the casing 1 preferably made from cast or spray material are mounted and assembled as follows. In each casing part an intermediate pinion 18 is slipped in from the front side at face 14 after which a stub shaft 16 is pressed from above through the top wall 12, the bearing 17 and the bottom wall 13. Subsequently an assembly of main pinion 19, main shaft 20 with bearings 22 and a ring 14 is arranged in the front face of the casing part, after which the next casing part provided with intermediate pinions is put in place so that the two head faces come into contact with one another. The ring 24 then centers the casing parts one with respect to the other because it accurately fits in the circular grooves 25. Subsequently bolts can be passed through the holes 27 and tightened.

According to the desired length of the cutter bar 1 the relevant number of parts is assembled in the manner described above. The machine can be finished in a desired manner.

FIG. 6 shows a head part on the right-hand side in FIG. 1. The head part also has the shape of a casing which is constructed so that a wing 32 is located outside the pitch circle 33 of a mowing nest 3. The wing is provided with a flange 34 for fastening to the side plate 4 of the mower. The outer face 35 of the flange 34 is positioned so that its prolongation is tangential to the pitch circle 33. Thus stripping of the crop to be mown is avoided.

Moreover the distance between the outer face 35 and the head face 14 of the head part of the casing is equal to half the length of the intermediate parts of FIG. 2.

FIG. 9 shows an embodiment in which the casing parts are made by extrusion from, for example, spray-castable synthetic resin. The top wall 12 or the bottom wall 13 respectively has a thickened, ridge-shaped part 35 on the inner side, which has to accommodate the shafts for the pinions.

Furthermore thickened ridges are provided on the inner side in the corners, said ridges having uninterrupted holes 36, through which a traction rod 37 is to be passed. Thus the parts of the casing can be shifted along the traction rod 37, after which all parts are simultaneously clamped together by a clamping means. At the front and at the rear a support screen, a nose fillet 30 or a supporting skid 31 may be arranged in any appropriate manner.

The invention is not limited to the embodiments described above. For example, the clamping or head face of each part may be constructed in any manner in dependence on the desired separation.

What is claimed is:

1. A mowing device essentially comprising an elongate, closed and rigid casing being movable along the ground and extending transversely of the direction of movement of the mowing device, said casing comprising an end-to-end series of box-shaped parts having head faces disposed in abutting relation and means fixedly clamping said head faces in abutting relation so as to provide said elongate, closed and rigid casing in substantially inflexible form, said casing having a top wall, a plurality of vertical shafts rotatably supported by said casing and projecting through said top wall, driving means within said casing causing said shafts to rotate and a cutting member fixed to each shaft in overlying relation to said casing.

2. A mowing device as claimed in claim 1 characterized that the casing is built up from two or more similar intermediate parts and two head parts, each intermediate part being of tubular form having opposite ends defining said head faces thereof, said head parts closing the opposite ends of the casing and each having one of said head faces disposed in face-to-face contact with a head face of an intermediate part.

3. A mowing device as claimed in claim 2 characterized in that the head parts are also similar to one another.

4. A mowing device as claimed in claim 1 or 2 characterized in that the head faces of the parts clamped to one another extend in the direction of movement and are located in a vertical plane.

5. A mowing device as claimed in claim 4 characterized in that each head face is contained in a plane which passes through the centre line of one of said vertical shafts.

6. A mowing device as claimed in claim 1 or 2 characterized in that said means fixedly clamping said head faces in abutting relation comprise clamping bolts which fixedly secure each box-shaped part of said series to the next part.

7. A mowing device as claimed in claims 1 or 2 characterized in that a centering member is arranged between the casing parts to be clamped to one another.

8. A mowing device as claimed in claim 7 characterized in that the centering member is formed by a ring fitted in an annular recess of the casing parts.

9. A mowing device as claimed in claim 1 or 2 characterized in that a sealing member is arranged between the head faces.

10. A mowing device as claimed in claim 9 characterized in that the sealing member is arranged in a depressed part in the head faces.

11. In a mowing device, an elongate, rigid casing having a plurality of spaced, parallel shafts journaled therein, each shaft having an upper end projecting through the casing and adapted to mount a rotary cutting means thereon, and drive means for rotating said shafts and including a gear fixed to each shaft within said casing, said casing including an intermediate portion of tubular configuration having a generally rectangular cross section and presenting open opposite ends with each of such ends being defined by a flat head face lying in a plane containing the respective axes of that pair of shafts which are most remote, and a pair of recessed head parts respectively closing the opposite ends of said intermediate portion, said head parts presenting flat head faces in face-to-face contact with the respective head faces of said intermediate portion, and means for fixedly securing the contacting head faces together to form the rigid casing.

12. In a mowing device as defined in claim 11 including locating means sandwiched between said head parts and said intermediate portion for maintaining the parts of said casing in alignment.

13. In a mowing device as defined in claim 11 or 12 wherein said intermediate portion is formed of at least two tubular sections presenting opposed, contacting flat head faces lying in a plane containing the axis of a shaft between said pair thereof, and means for fixedly securing the last-mentioned head faces together.

* * * * *